July 27, 1943.  H. K. ELLIOTT  2,325,491

MACHINERY KEY

Filed Dec. 26, 1940

Harrison K. Elliott INVENTOR

BY
Clarke & Doolittle
ATTORNEYS

Patented July 27, 1943

2,325,491

UNITED STATES PATENT OFFICE 2,325,491

MACHINERY KEY

Harrison K. Elliott, Center Township, Butler County, Pa., assignor of fifty-one one-hundredths to Pittsburgh Steel Drum Company, Pittsburgh, Pa., a corporation of Delaware Application December 26, 1940, Serial No. 371,608

2 Claims. (Cl. 287—52.05)

This invention is an improvement in the art of machinery keys or gibs for connection between a driving or driven shaft and a pulley or gear or the like. Ordinarily in such connections, the key engages a shaft keyway and a registering gear keyway for driving or driven rotation, such key being tightly driven and making a close compensating fit in the keyway of each such member. The present invention is designed to overcome frictional or binding resistance in withdrawing the key by wedging action thereon, applied in a transverse direction and exerting force longitudinally of the key, for its easy release and removal.

Two forms of the invention are disclosed in the accompanying drawing, in which.

Figure 2:
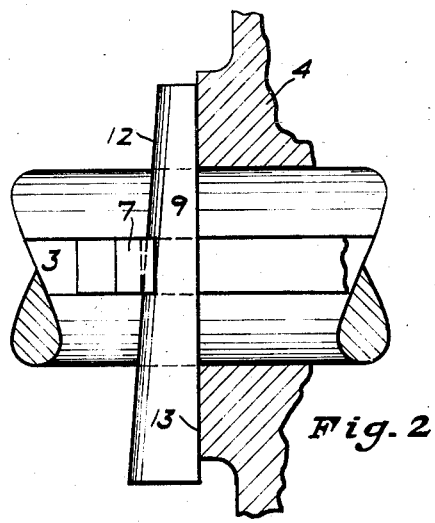
Fig. 2 is a plan view of Fig. 1.
Figure 4:
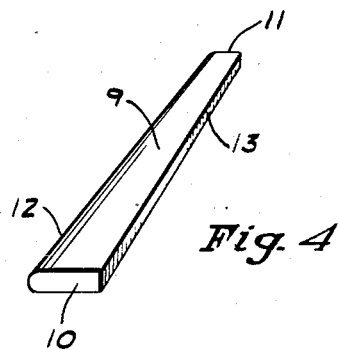
Fig. 4 is a similar view of the wedge.

In the form of the invention shown in Figs. 1 to 4 inclusive a shaft 2 having a keyway 3 is connected with the hub 4 of a pulley, gear, or the like having a registering keyway 5. Ordinarily such members are in driving and driven connection by a tightly driven-in key which must be withdrawn before the pulley etc. may be removed. As a rule such removal is difficult, especially when the key is old or rusty or otherwise fixed in position.

In my invention the key 6 is, for its main body portion rectangular in cross section, or of other cross section, engageable with the conforming keyways 3 and 5, and is usually substantially straight throughout.

Its outer driving end is provided with a reversed lip portion 7, providing an intervening wedge-engaging socket 8, preferably concaved as shown, at the rear.

For the purpose of applying extracting force to the key I provide a wedge 9 of comparatively slight taper from the driving-in end 10 to the opposite end 11, having a rounded edge 12 for engaging the concaved socket 8 and a squared edge 13 engageable with the face of hub 4.

Figure 1:
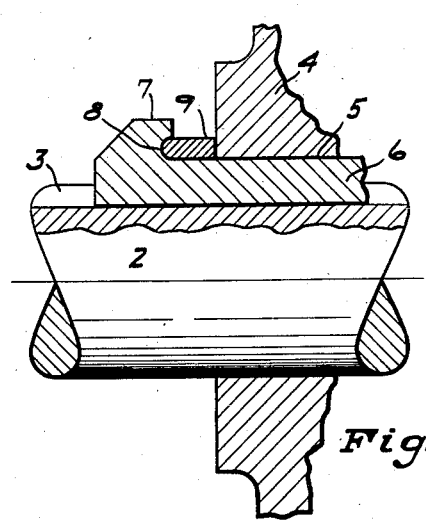
Fig. 1 is a sectional view showing the shaft and hub connected by a key, with the removing wedge in operative position.

The overall length of the wedge is just sufficient to leave sufficient clearance between the hub face and the socket for insertion of the small end and entering portion of the wedge, as in Fig. 1. Thereafter further driving of the wedge, as by a hammer, will exert extracting force on the key 6 sufficient to loosen it for further easy removal.

Figure 5:
Fig. 5 is a view like Fig. 3 showing a modified construction.
Figure 6:
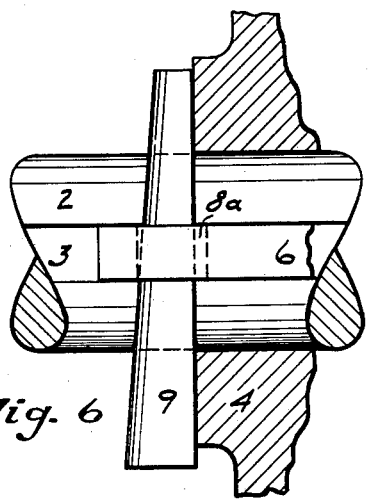
Fig. 6 is a plan view of Fig. 5 showing the key and wedge in operative position.
Figure 3:
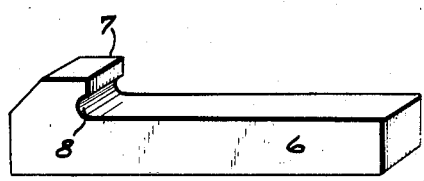
Fig. 3 is an isometric view of the key.

I show in Figs. 5 and 6 a modified construction in which the key 6 is uniformly straight throughout, and is provided at its outer portion with a closed transverse socket 8a, also preferably concaved for engagement by the rounded edge 12 of the wedge 9.

Socket 8a is amply long to ensure clearance of the other hub-bearing edge 13 at all positions, as in Fig. 6.

The construction and use of my improvement in machinery keys and releasing wedge therefor, of either form, will be readily understood and appreciated by all those familiar with such devices.

It is comparatively easy and cheap to manufacture, may be made in various sizes appropriate to use with different dimensions of shafting and hub, and successfully solves the troublesome problem of releasing and removing such keys in many and various uses for which they may be adapted.

Thus keys withdrawn by present practice and methods are frequently damaged to such an extent that they must be entirely replaced when parts are reassembled. Such operations involve expense and loss of time as keys must always be accurately fitted by hand.

My invention overcomes such various objections and by it the key may be removed without damage and replaced without necessity of and avoiding loss of time required to fit a new key.

What I claim is:

1. In combination with a holding key for a shaft and the hub of a gear member, each having a keyway, a main rectangular parallel side shank portion provided at its outer driving end with a transverse wedge engaging socket between its main shank portion and an integral portion extending upwardly therefrom and towards its opposite end, and a wedge engageable with said socket and with the hub.

2. In combination with a holding key for a shaft and the hub of a gear member, each having a keyway, a main rectangular parallel side shank portion provided at its outer driving end with a transverse concaved wedge engaging socket between its main shank portion and an integral portion extending upwardly therefrom and towards its opposite end, and a wedge having a rounded edge portion engageable with said socket and an opposite edge engageable with the hub.

HARRISON K. ELLIOTT.